United States Patent
Brown

(10) Patent No.: US 9,504,942 B2
(45) Date of Patent: Nov. 29, 2016

(54) OVERTIGHTENING PROTECTED FLUIDS FILTER

(71) Applicant: Scott D. Brown, Maize, KS (US)

(72) Inventor: Scott D. Brown, Maize, KS (US)

( * ) Notice: Subject to any disclaimer, the term of this patent is extended or adjusted under 35 U.S.C. 154(b) by 273 days.

(21) Appl. No.: 14/159,674

(22) Filed: Jan. 21, 2014

(65) Prior Publication Data

US 2014/0183119 A1  Jul. 3, 2014

(51) Int. Cl.
*B01D 27/08* (2006.01)
*B01D 35/30* (2006.01)

(52) U.S. Cl.
CPC .............. *B01D 35/30* (2013.01); *B01D 27/08* (2013.01); *B01D 2201/24* (2013.01); *B01D 2201/305* (2013.01); *B01D 2201/40* (2013.01)

(58) Field of Classification Search
None
See application file for complete search history.

(56) References Cited

U.S. PATENT DOCUMENTS

| 6,082,565 A | 7/2000 | Harrold |
| 8,815,087 B2 * | 8/2014 | Bilski ................. B01D 27/08 210/232 |

FOREIGN PATENT DOCUMENTS

DE    102009017086 A1 * 12/2009

* cited by examiner

*Primary Examiner* — Thomas M Lithgow
(74) *Attorney, Agent, or Firm* — Kenneth H. Jack; Davis & Jack, L.L.C.

(57) ABSTRACT

A filter incorporating a vessel defining an interior space, the vessel having a ceiling and a floor; filter media contained within the interior space; a helically threaded port which opens the vessel's interior space at the ceiling; a turn plate having a an outer edge; a retainer ring and snap ridges combination which interconnects the turn plate and the vessel, positions the plate beneath the floor, and facilitates circumferential motion of the plate's outer edge; a turn handle connected operatively to the plate, the turn handle being adapted for impelling the turn plate's circumferential motion; and ratcheting hook and ridge combinations which further interconnect the turn plate and the vessel, the hooks and ridges being adapted for, upon turning of the handle, translating a limited screw tightening torque to the ceiling's helically threaded port.

11 Claims, 10 Drawing Sheets

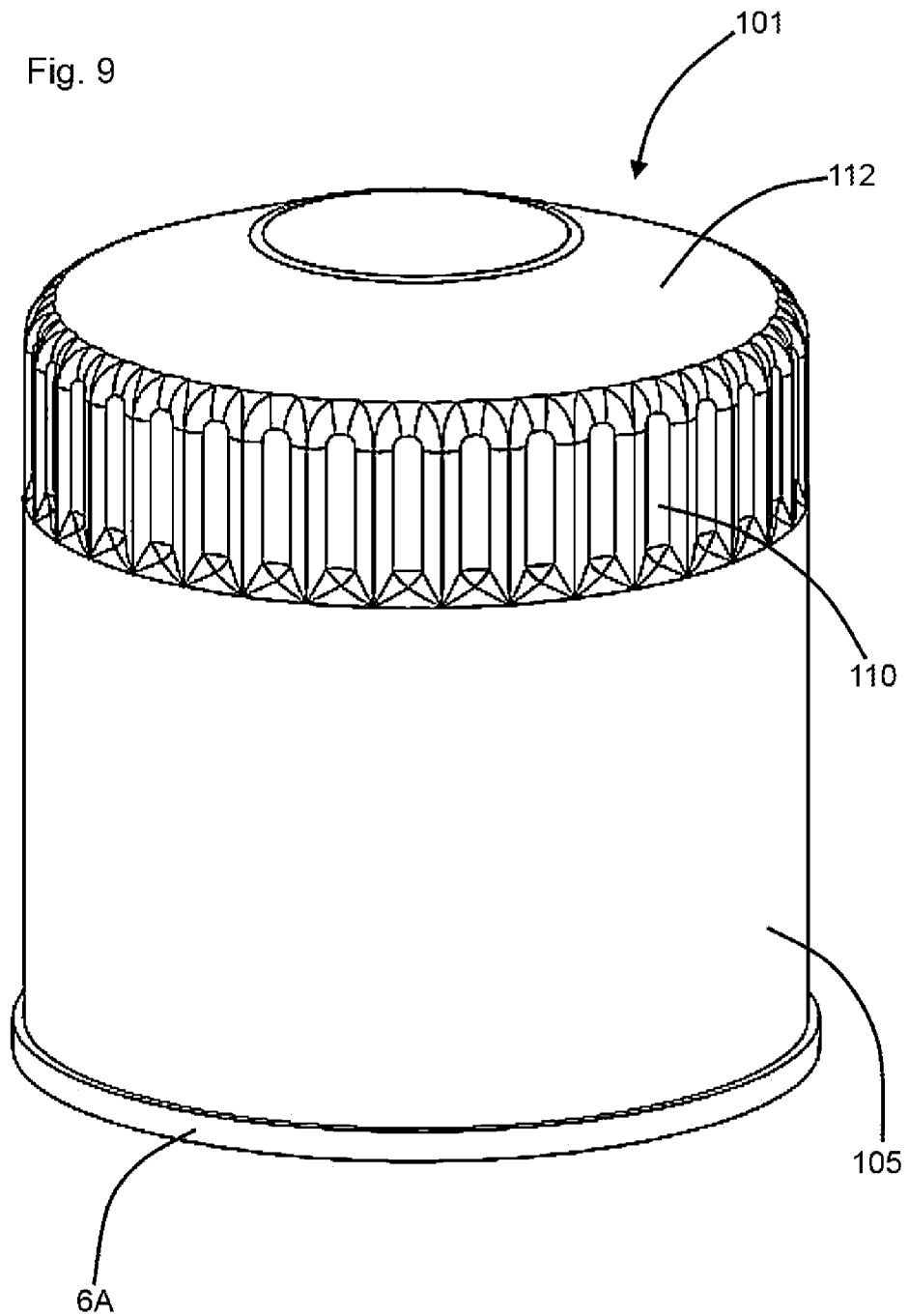

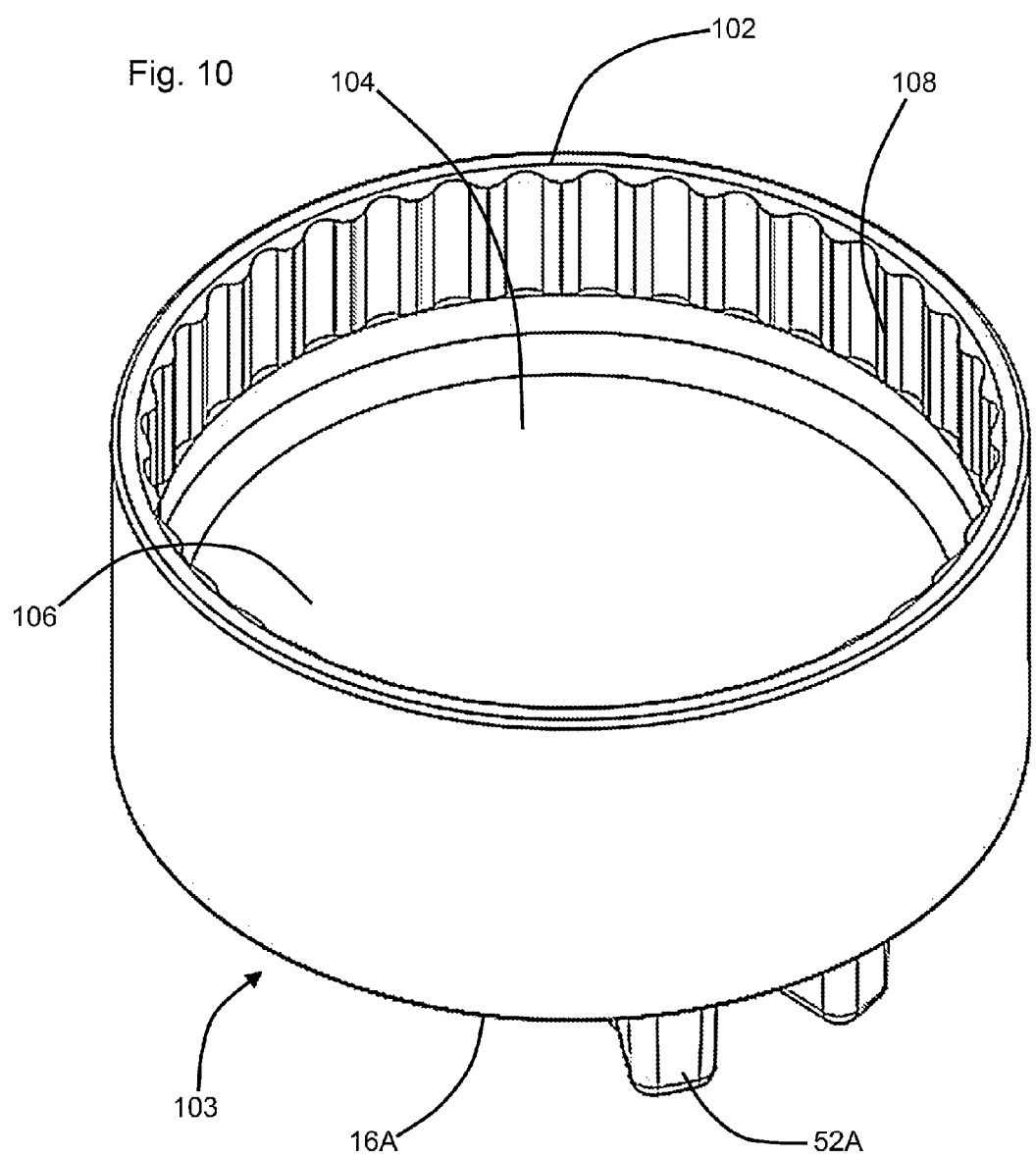

OVERTIGHTENING PROTECTED FLUIDS FILTER

FIELD OF THE INVENTION

This invention relates to filters for cleansing engine fluids such as oil, gasoline, and diesel fuel. The invention further relates to apparatus and mechanisms for assisting in installation and deinstallation of such filters.

BACKGROUND OF THE INVENTION

Canister filters of the type which are adapted for cleansing an internal combustion engine's fuel or oil commonly incorporate a ceiling component which presents a sealing ring, a plurality of oil or fuel intake ports, and a centrally positioned helically threaded fluid output port. The helically threaded output port of such a filter commonly functions as engine mounting means. In the event of excessive screw tightening of such filter upon installation, the filter's elastomeric sealing ring may overcompress, resulting in tearing or plastic deformation of the ring, and causing undesirable leakage of oil or fuel. In the event of undertightening upon filter installation, subsequent vibration induced loosening of the filter may occur, also resulting in undesirable leakage of fuel.

The instant inventive engine fluids filter solves or ameliorates the problems, defects, and disadvantages of common canister type engine fluids filters by incorporating specially configured floor components which assure a proper level of screw tightening torque upon filter installation and which facilitate sufficient counter-torque for screw loosening deinstallation of a stuck or seized filter.

BRIEF SUMMARY OF THE INVENTION

The instant inventive filter is intended to function in place of an engine's conventional screw on canister type oil or fuel filter.

A first structural component of the instant inventive filter comprises a vessel which defines an interior fluids filtering and cleansing space. In a preferred embodiment, the vessel comprises an annular outer or radially positioned wall, a ceiling, and a hermetically sealed floor.

A further structural component of the instant inventive filter comprises filter media which commonly constitutes a pleated and cylindrical cellulose fiber element having integrally impregnated synthetic fibers such as fiberglass or polyester.

A further structural component of the instant inventive filter comprises a helically threaded and centrally or axially position fluids output port, such port opening the vessel's interior space at the ceiling. In a preferred embodiment, the vessel's interior is further opened at the ceiling by a plurality of fluid intake ports which are arrayed radially about the central output port. An elastomeric sealing ring is commonly disposed upon the ceiling's upper surface, such ring being positioned between the ceiling's typically circular outer edge and the fluid intake ports. A mounting adapter installed in line with an internal combustion engine's oil or fuel line commonly includes a mating helically threaded mount. Upon installation of the filter, such mount effectively incorporates the filter's intake port, filter media, and output port as fluid conveying components of the engine's fluids transport system.

A further structural component of the instant inventive filter comprises a turnable or rotatably movable plate having a radially outer periphery, such plate being fitted for mounting directly beneath the vessel's floor.

A further structural component of the instant inventive filter comprises plate mounting means which interconnect the turn plate and the vessel. The plate mounting means operatively hold the turn plate beneath the vessel's floor and facilitate alternative circumferential and counter-circumferential motions of the plate's radially outer portions with respect to the vessel. In a preferred embodiment, the plate mounting means comprise a downwardly opening socket which is defined by a wall or flange extending annularly about and downwardly from the outer periphery of the vessel's floor. In the preferred embodiment, such socket is closely fitted for nestingly receiving the turn plate. Where such flange and socket plate mounting means components are provided, the turn plate may be advantageously held within such socket by further incorporating within the invention's plate mounting means a snap ring and snap flanges combination.

A further structural component of the instant inventive filter comprises torque means which are connected operatively to the plate and which are adapted for, upon actuation, impelling circumferential motions of the plate's radially outer periphery with respect to the vessel. In a preferred embodiment, the torque means comprise a handle which is fixedly attached to and extends downwardly from the undersurface of the plate. Suitably, the torque means may additionally or alternatively comprise a non-circular wrench engaging socket or lug. Where the torque means comprise a turn handle, such means may advantageously further comprise such a wrench socket positioned to open centrally and axially at the handle. Provision of such combined torque means advantageously facilitates alternative hand turning and wrench assisted turning.

Further structural components of the instant inventive filter comprise ratchet means which further interconnect the turn plate and the vessel. In a preferred embodiment, the ratchet means are adapted for, upon operation of the torque means to circumferentially move the plate's radially outer periphery, translating a limited screw tightening torque to the ceiling's helically threaded port and to an engaged helically threaded filter mount. In the preferred embodiment, the torque means are further adapted for alternatively impelling counter-circumferential plate motion which oppositely translates screw loosening torque. The ratchet means' adaptation for screw loosening counter-torque may advantageously produce a turning moment having a magnitude equal to or greater than that of the limited screw tightening torque. The ratchet means preferably comprise radial arrays of hooks and ridges which are configured to allow free circumferential passages of the hooks beneath the ridges upon application of a prescribed and suitable level of screw tightening torque, and are configured to alternatively resist any such passage upon a reverse application of relatively unlimited counter-torque.

In use of the instant inventive filter, and assuming provision of all of the preferred structures described above, an operator may initially grasp the filter by its turn handle and may position the filter immediately beneath an engine's helically threaded oil or fuel filter mount. Thereafter, the user may commence screw turning and threaded mounting of the filter. During such screw threading installation, the applied circumferentially directed torque eventually reaches the ratchet means' screw tightening torque limit. At that point, the invention's torque means and ratchet means work together to terminate the application of screw tightening torque at a preferably prescribed and calibrated tightness.

Provided that the ratchet means' spring biasing components, contact angles, and frictional characteristics are tailored to provide the prescribed level of installation torque at such point, a proper hermetic seal is created without any excess deformation of the seal ring.

Opposite turning or counter-turning of such handle advantageously causes the ratchet means to provide screw loosening counter-torque having the magnitude which is equal to or in excess of the screw tightening torque. Configuring the ratchet means for providing such excess counter-torque advantageously assures that the inventive filter facilitates unscrewing deinstallation of stuck or seized filters.

Accordingly, objects of the instant invention include the provision of an engine fluids filter which incorporates structures, as described above, and which arranges those structures in relation to each other in manners described above for achievement of the objects, benefits, and advantages set forth above.

Other and further objects, benefits, and advantages of the present invention will become known to those skilled in the art upon review of the Detailed Description which follows, and upon review of the appended drawings.

BRIEF DESCRIPTION OF THE DRAWINGS

FIGS. 9 and 10 show lower and upper components of the alternative FIG. 8 filter in their pre-attachment configurations.

DETAILED DESCRIPTION OF PREFERRED EMBODIMENTS

Figure 1:
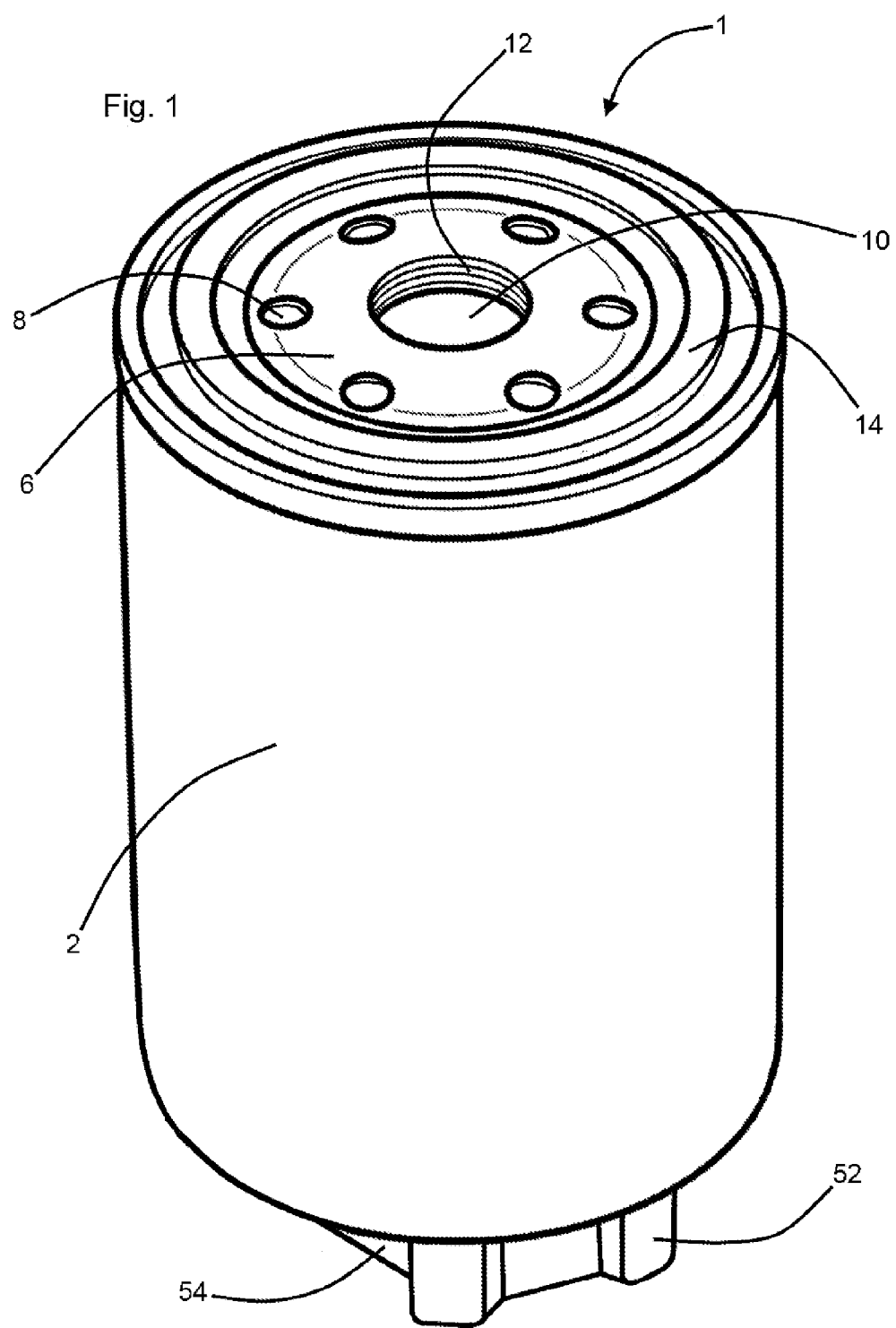
FIG. 1 is a perspective view of the instant inventive filter.
Figure 2:
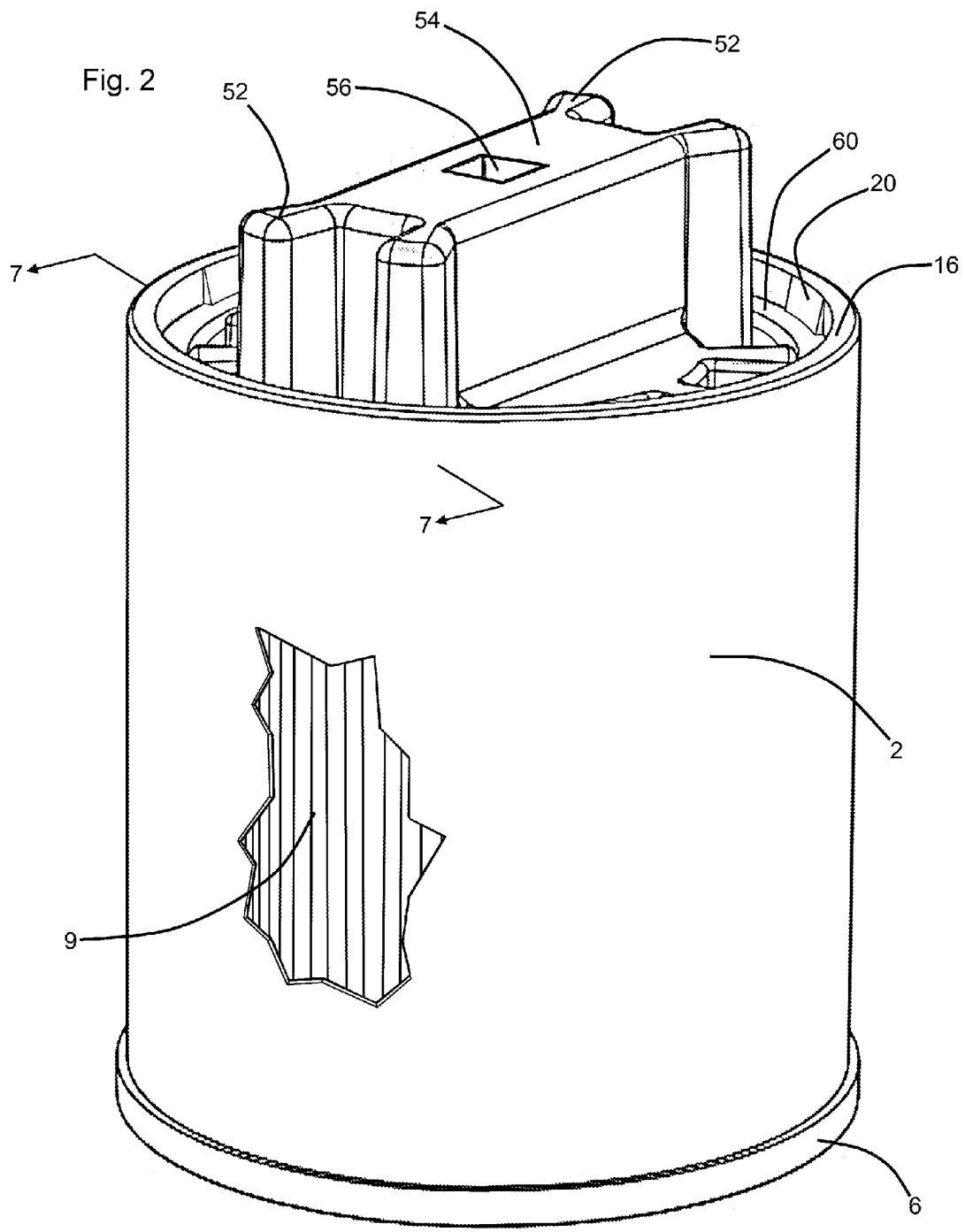
FIG. 2 is an alternative inverted view of the filter of FIG. 1, the view of FIG. 2 including a "cutaway" window showing interior structures.
Figure 7:
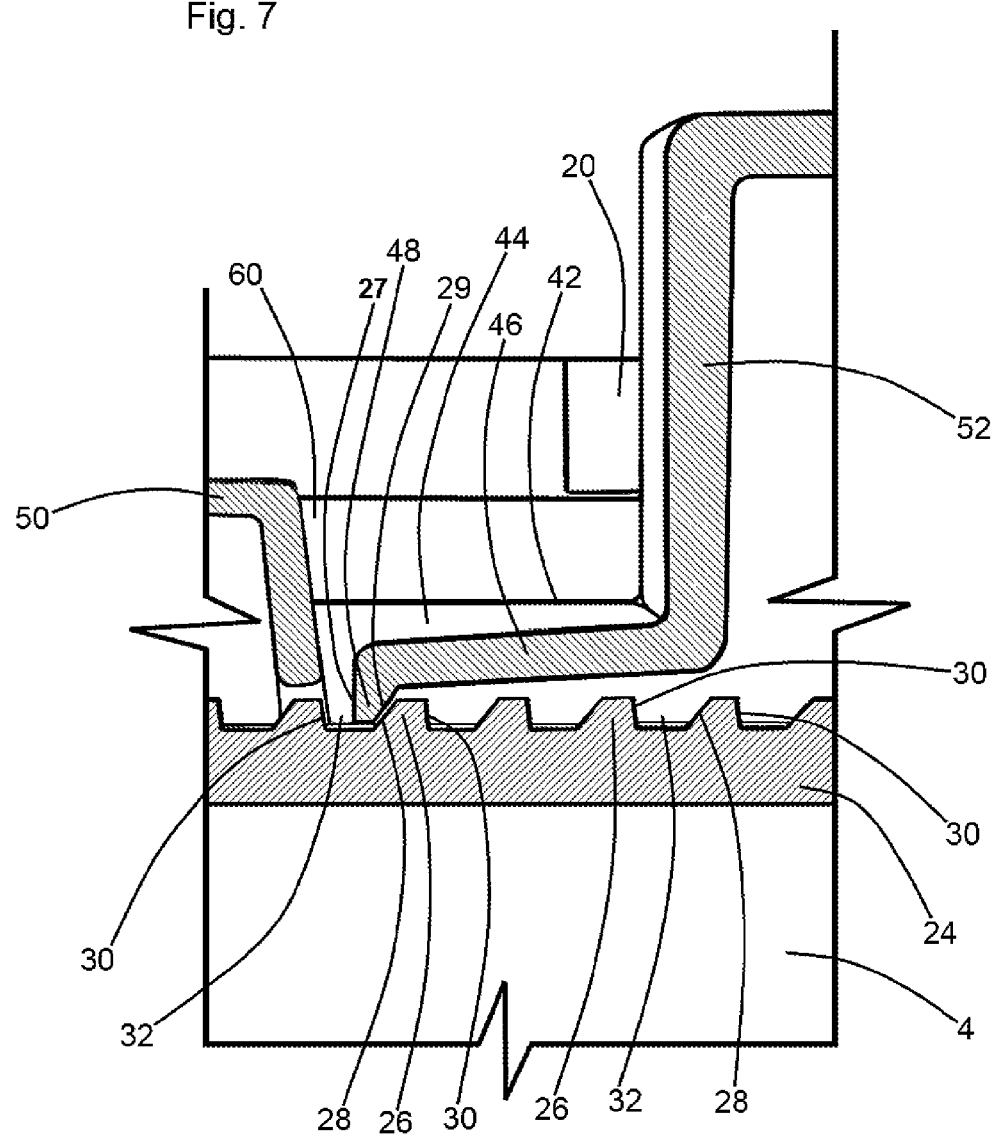
FIG. 7 is a partial sectional view as indicated in FIG. 2.

Referring now to the drawings, and in particular simultaneously to FIGS. 1, 2, and 7, a preferred embodiment of the instant inventive filter is referred to generally by Reference Arrow 1. The filter 1 is preferably comprises a cylindrical vessel having an annular outer wall 2 which forms and defines a hollow interior space 4, such space receiving and housing filtering media 9.

A circular ceiling or cap 6 is fixedly and hermetically attached to the upper end of the outer wall 2 of the vessel. In the preferred embodiment, the ceiling 6 presents a radial array of engine fluid (typically oil or fuel) intake ports 8 and presents an axial or centrally positioned oil or fuel output port 10. In the preferred embodiment, the annular inner surface of output port 10 includes female helical threads 12, such threads 12 facilitating screw threaded attachment of the filter 1 to an engine's helically threaded filter mount (not depicted within views). An elastomeric fluid sealing ring 14 is preferably mounted upon the upper surface of ceiling 6, such seal 14 assuring that oil or fuel which enters ports 8 for flow through filter media 9 and emission at port 10, does not outwardly leak.

Referring simultaneously to FIGS. 1-7, the instant inventive filter preferably further comprises a circular plate 42. In a preferred embodiment, plate 42 comprises durable injection molded plastic. Plate mounting means are provided for securely rotatably or turnably positioning the plate 42 immediately beneath the vessel's floor 24. In the preferred embodiment, such mounting means comprise a slide channel 23 formed at the annular outer periphery of the floor 24. The invention's mounting means preferably further comprise a downwardly opening plate receiving socket 18 which is peripherally bounded by an annular flange or wall 16, such wall extending downwardly from the lower end of vessel wall 2.

Figure 3:
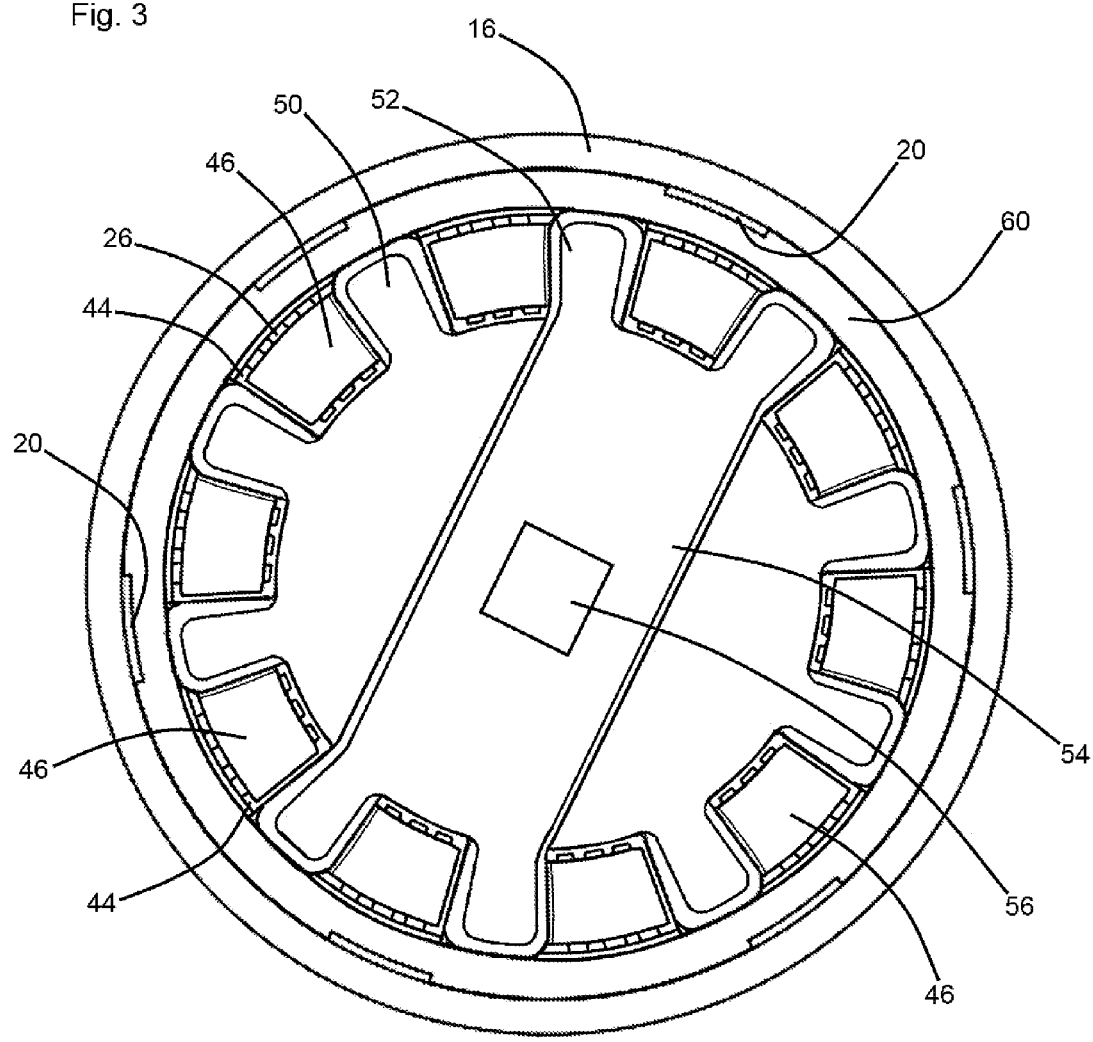
FIG. 3 is a plan view of the lower end of the filter of FIGS. 1 and 2.
Figure 4:
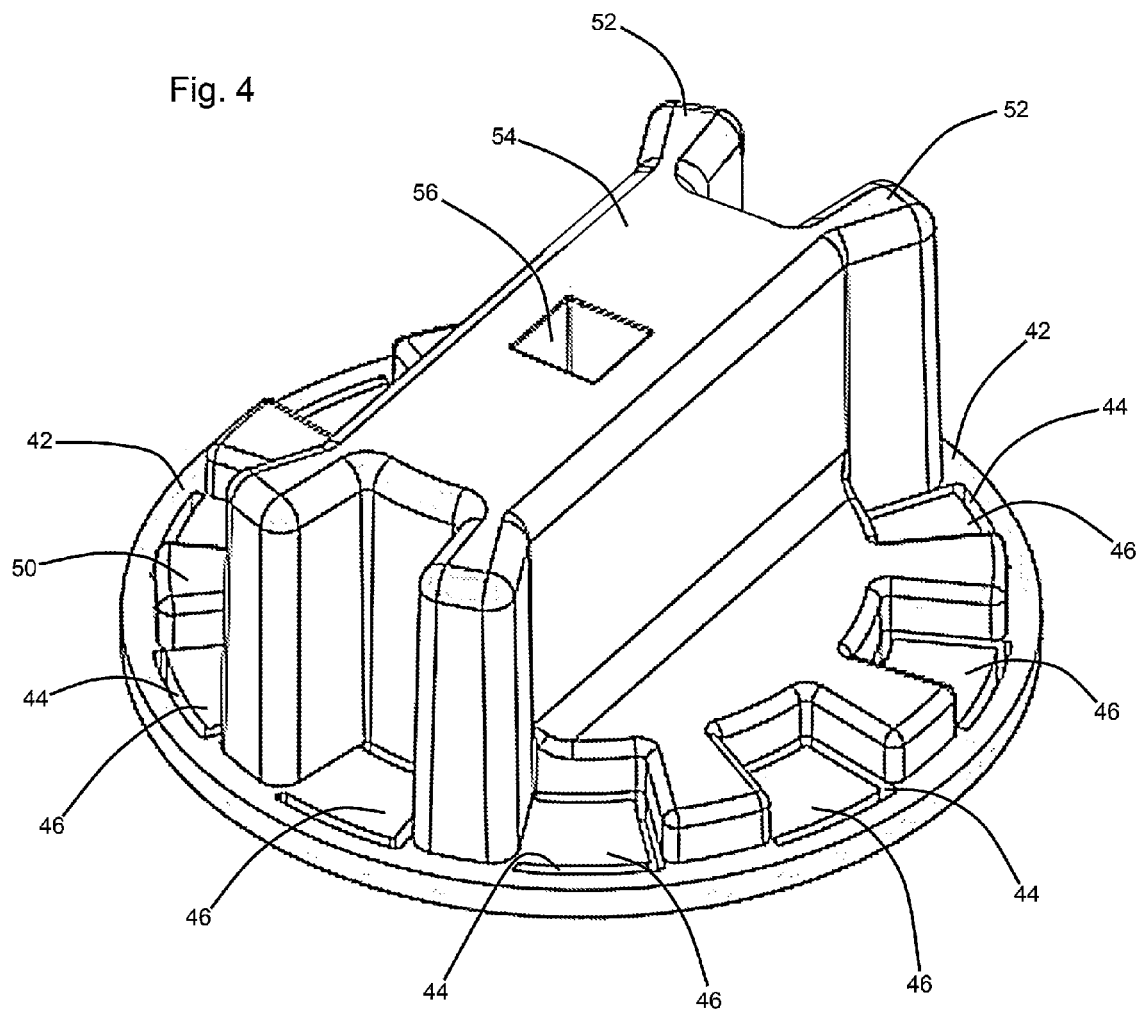
FIG. 4 is a perspective, inverted, and separated or disassembled view of a plate component of the instant inventive filter.
Figure 5:
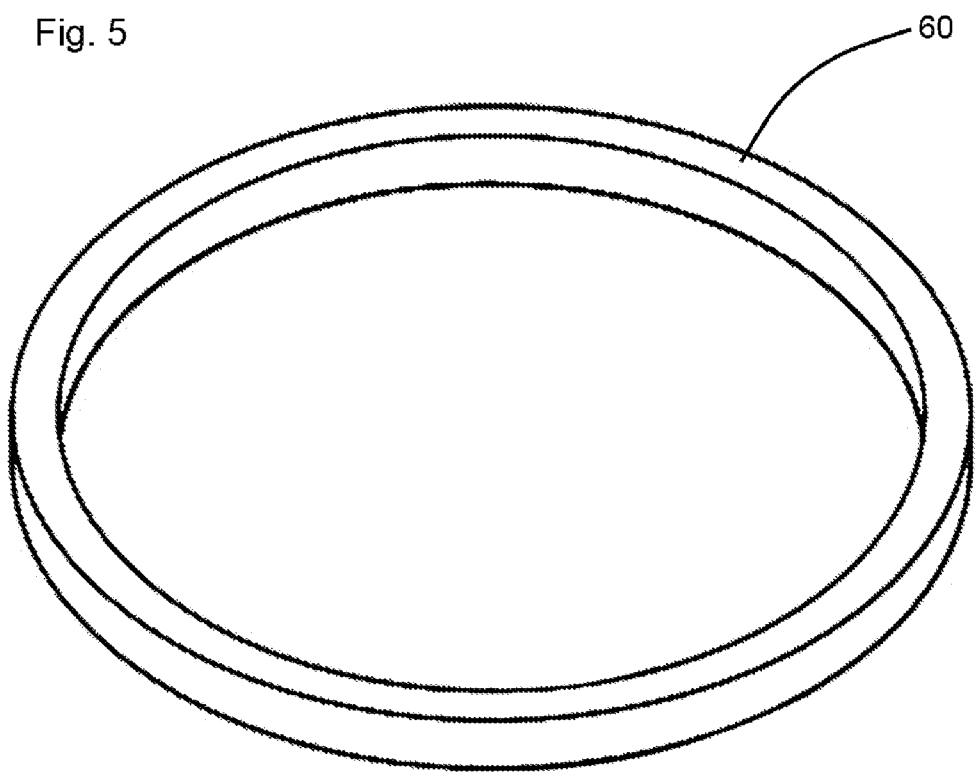
FIG. 5 is a perspective and separated view of a mounting ring component of the inventive filter.
Figure 6:
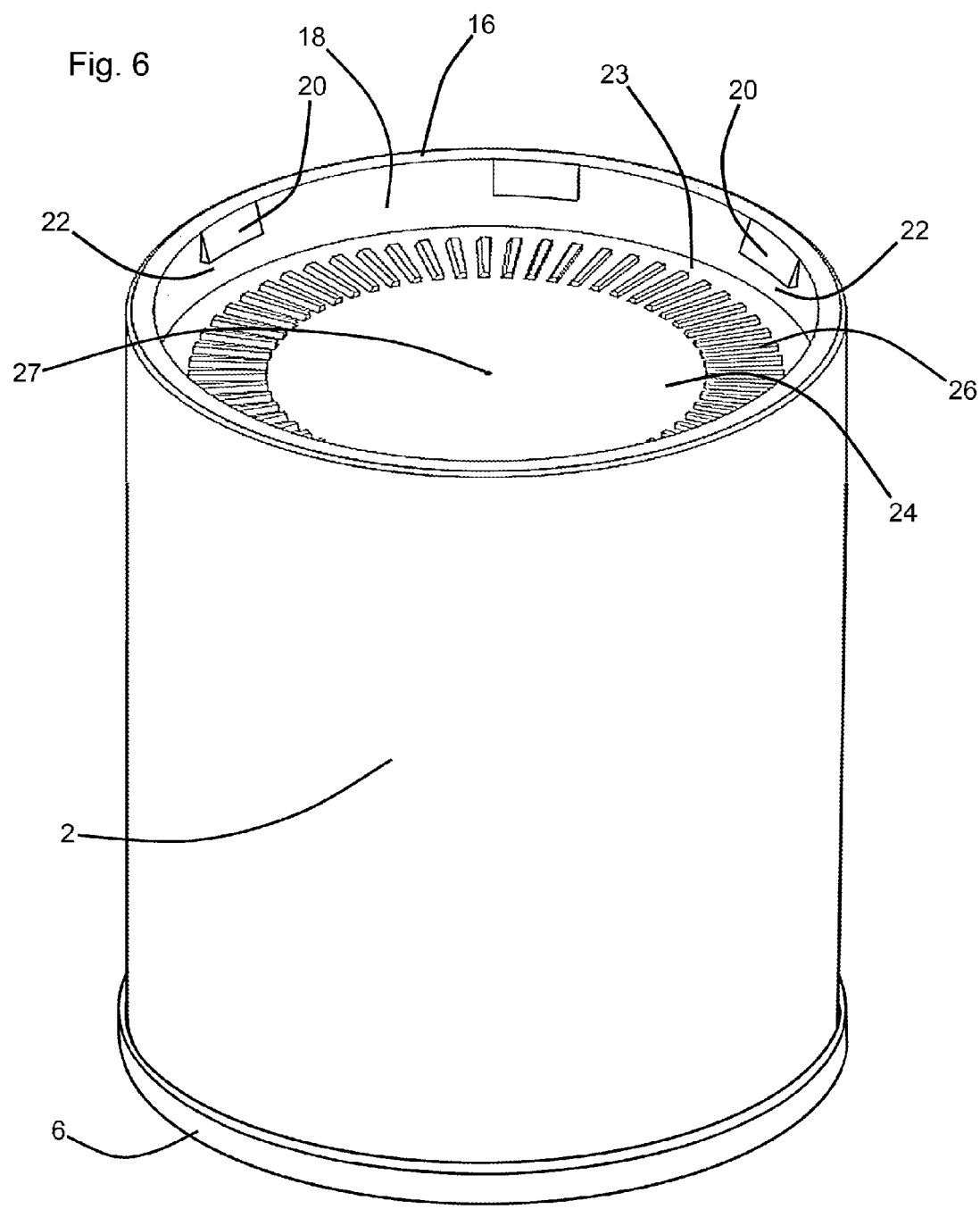
FIG. 6 redepicts the structure of FIG. 2, the view of FIG. 6 showing plate and mounting ring components removed.

Upon an upward receipt of plate 42 within socket 18 as depicted in FIGS. 2 and 3, and upon a subsequent upward insertion of a rigid retainer ring 60 into socket 18 to immediately underlie the radially outer periphery of plate 42, such ring 60 may slidably move past snap ridges 20, and may thereby be held in place. Accordingly, upon assembly of the mounting means as indicated in FIGS. 2, 3, and 7, plate 42 is securely held in place within socket 18 for rotary or alternative circumferential and counter-circumferential motions. The combination of the socket 18, annular wall 16, retainer ring 60, and snap ridges 20 is considered to be representative of other commonly known means for rotatably mounting plate 42 beneath floor 24 including, but not being limited to, axle mounts.

Torque means for alternatively turning and counter-turning plate 42 are provided. In a preferred embodiment such means comprise a downwardly extending handle 54 which presents a plurality of radially extending finger and thumb engaging flanges 52. Upon manually grasping handle 54, an installer or deinstaller of the filter 1 may easily and conveniently apply filter installing "screw-on" torque or filter deinstalling "screw-off" counter-torque. In the preferred embodiment, a non-circular wrench receiving socket 56 is advantageously additionally provided for facilitating alternative wrench assisted filter installations and deinstallations.

Ratchet means which further operatively interconnect the plate 42 and the vessel 2 are provided. In the preferred embodiment, the ratchet means are adapted for, upon operation of the torque means (either handle 54 or wrench socket 56) to circumferentially turn plate 42 (i.e., a turning of the plate in the clockwise direction according to the views of FIGS. 2-4, and 7), translating a limited and preferably precisely calibrated screw tightening torque to the helically threaded port 10.

In a preferred embodiment, the ratchet means comprise a multiplicity of hook engaging and releasing ridges 26 which extend downwardly from floor 24 and which are evenly spaced radially about the filter's central rotational axis 27. The ridges 26 are preferably specially configured for engaging a radial array of upwardly extending hooks 48 which are preferably wholly formed with the distal ends of elastically deflectable spring arms 46. In the preferred embodiment, the spring arms 46 are formed wholly with plate 42 via a radial array of "U" slots 44. The spring arms 46 are representative of other spring means which may be alternatively provided for normally moving ratchet hooks or ridges into a motion resisting positions with respect to each other, such means including helical compression springs and elastic bands.

In the preferred embodiment, plate stiffening buttresses 50 are wholly formed with and downwardly extend from the plate 42, such buttresses 50 being interposed between the "U" slots 44 and such slots' spring arms 46. The spring arms 46 are preferably configured to normally hold hooks 48 at their upwardly extended positions between adjacent pairs of ridges 26 and within valleys 32 formed by the ridge pairs.

As can be seen particularly in FIG. 7, each of the counter-circumferentially oriented faces 28 of the ridges 26 extends at an acutely sloped angle (preferably approximately 45°), such faces extending circumferentially and downwardly from the undersurface of floor 24. Each of the circumferentially oriented faces 29 of the upwardly extending hooks 48 is preferably correspondingly sloped (also at approximately 45°) in upward and counter-circumferential directions with respect to the distal ends of the spring arms 46. Such angular matching of the ratcheting contact faces 28 and 29 assures that upon forceful clockwise or circumferentially directed turning of the plate 42, the paired and abutting faces 28 and 29 will act as an inclined plane machines which flexibly drive the distal ends of the spring arms 46 downwardly until the upper ends of their hooks 48 slidably move beneath the lower ends of the ridges 26.

In the preferred embodiment, the levels of elasticity or spring constants of the spring arms 46, the slopes of the ridge and hook face combinations 28 and 29, and the coefficients of friction of the slide surfaces are precisely adjusted and calibrated for limiting circumferentially directed torque. Accordingly, the invention's ratchet means are configured to assure that a prescribed amount of filter installing screw tightening torque is reached immediately prior to the onset of sliding movements of the hooks 48 beneath the ridges 26. In the preferred embodiment, upon the onset of such hook undersliding, a sufficient and calibrated level of filter installing screw tightening torque is applied. Further turning after such onset of hook undersliding advantageously produces no additional torque and no additional compression of seal 14. The operator tactily and audibly detects that the maximum and prescribed "screw-on" torque has been reached through the ratchet's rapid clicking sound. Accordingly, the torque limiting function of the ratchet means protects against compressed seal induced oil leaks.

While it is preferred that both the counter-circumferential faces 28 of ridges 26 and the circumferential faces 29 of hooks 48 be matchingly and abutting sloped, either of such faces may be suitably (though less desirably) sloped with the opposing contact surface constituting an unmatched corner or edge.

It may be seen that upon counter-circumferential turning of plate 42, the counter-circumferential faces 27 of hooks 48 move in the counter-circumferential direction until such faces impinge against the circumferential faces 30 of ridges 26. In the preferred embodiment, such impinging faces 29 and 30 are sharply angled so that hooks 48 are effectively latched and held within valleys 32 during such plate counter-turning. By configuring ridge and hook faces 30 and 27 for such latching engagements upon counter-turning of the plate 42, filter deinstalling or unscrewing torque far in excess of the limited magnitude of the filter installation torque may be applied. Accordingly, the preferred configuration of the ratchet means allows counter-torque to reliably deinstall stuck or seized oil filters in need of changing, while assuring a proper level of installation torque upon initial installation.

Figure 8:
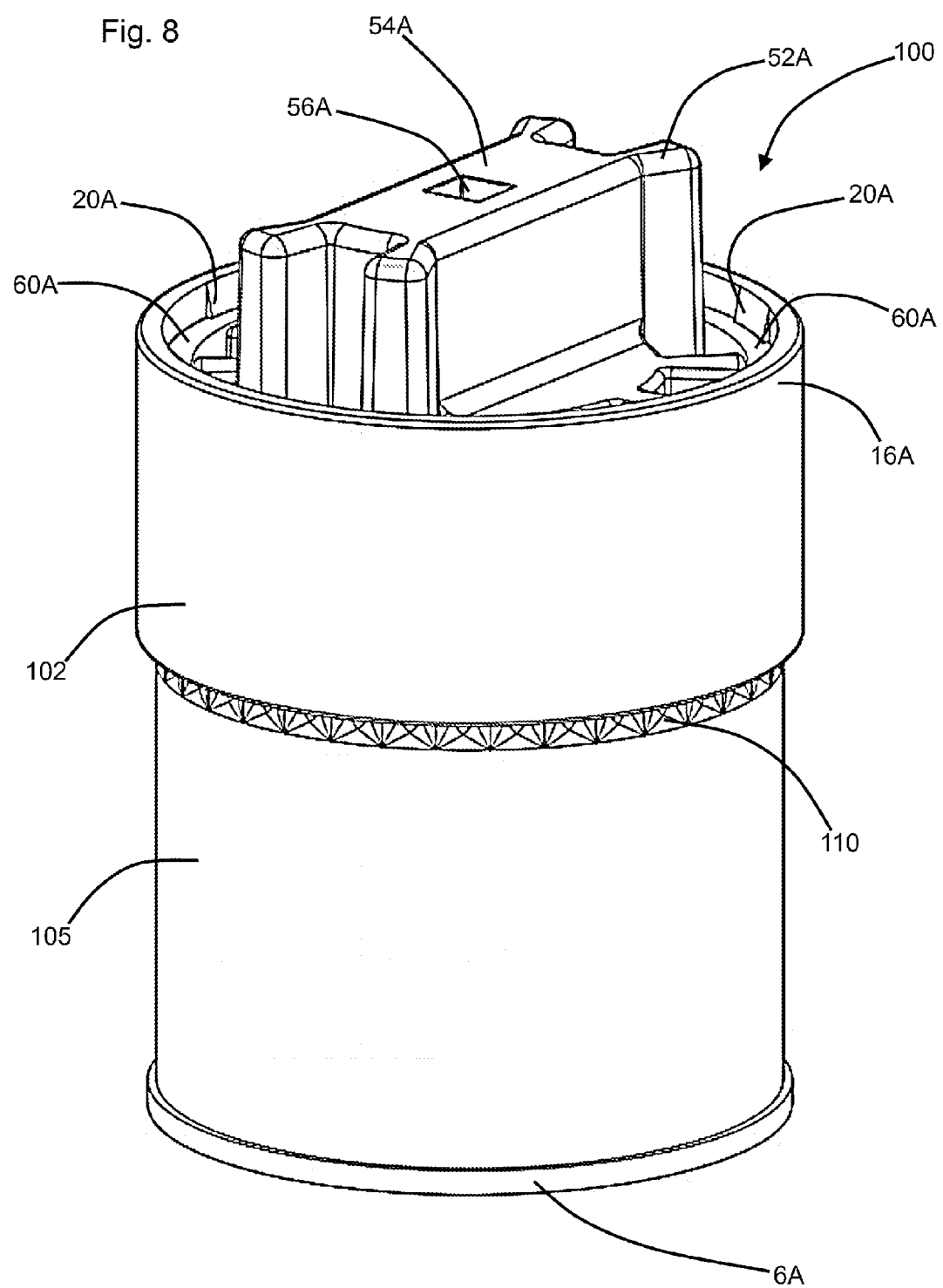
FIG. 8 presents an alternate configuration of the filter of FIG. 2.

Referring further to the alternative filter configuration of FIGS. 8-10, all structures identified by a reference numeral having the suffix "A" are configured substantially identically with similarly numbered structures appearing in FIGS. 1-7. In comparison with the single layer filter floor 24 of the FIGS. 1-7 filter configuration, the corresponding floor of the alternative modular filter 100 of FIGS. 8-10 comprises a stacked combination of a floor 112 of a conventional oil or fuel filter 101 and a base or floor 104 of an adaptor 103. The upwardly opening socket space 106 of adaptor socket 103 may be fitted for nestingly receiving the lower floor 112 of the conventional canister type oil or fuel filter 101, and in order to enhance the nesting fit of floor 112 within socket 106, ridges 108 extending inwardly from socket wall 102 may be spaced and sized for engagement with frictional ridges 110 of the conventional filter 101. In a preferred embodiment, adaptor 103 is permanently adhesively bonded to filter 101. Upon such bonding, socket wall 102 is effectively integrated with filter wall 105 for functioning substantially identically with wall 2 of filter 1.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A filter comprising:
    (a) a vessel defining an interior space, the vessel having a ceiling and a floor;
    (b) filter media within the interior space;
    (c) a helically threaded port, said port opening the vessel's interior space at the ceiling;
    (d) a plate having a radially outer end;
    (e) mounting means interconnecting the plate and the vessel, the mounting means comprising a downwardly opening plate receiving socket, said socket having an annular socket wall and being fitted for nestingly receiving the plate, the mounting means positioning the plate beneath the floor and facilitating alternative circumferential and counter-circumferential plate outer end motions;
    (f) torque means connected operatively to the plate, the torque means being adapted for alternatively impelling the circumferential and counter-circumferential motions; and
    (g) ratchet means further interconnecting the plate and the vessel, the ratchet means being adapted for, upon operation of the torque means for impelling the circumferential motion, translating a limited screw tightening torque to the helically threaded port, wherein the mounting means further comprise a plurality of retaining clips, each retaining clip being fixedly attached to and extending inwardly from the annular socket wall.

2. The filter of claim 1 wherein the ratchet means are further adapted for, upon the alternative operation of the torque means for impelling of the counter-circumferential motion, alternatively translating a screw loosening counter-torque to the helically threaded port, the magnitude of the screw loosening counter-torque being equal to or greater than that of the limited screw tightening torque.

3. The filter of claim 2 wherein the ratchet means comprise a plurality of hook and ridge combinations.

4. The filter of claim 3 wherein the ratchet means further comprise spring means, the spring means adapted for normally positioning each of the ratchet means' hooks between an adjacent pair of ridges among the ratchet means' ridges.

5. The filter of claim 4 wherein the spring means comprise a plurality of elastically deflectable arms, each arm among said plurality of arms having a proximal end and a distal end, each of said arms' proximal ends being fixedly attached to the plate, and each of said arms' distal ends supporting one of the hooks.

6. The filter of claim 5 wherein each of the ridges is fixedly attached to and extends downwardly from the vessel's floor.

7. The filter of claim 6 wherein the vessel has an axis of rotation and wherein the ridges are arrayed radially about the axis of rotation.

8. The filter of claim 7 wherein the hooks and ridges respectively have circumferential and counter-circumferential faces, each face among the ridges' counter-circumferential faces extending downwardly and circumferentially, or each face among the hooks' circumferential faces extending upwardly and counter-circumferentially.

9. The filter of claim 8 wherein the hooks and ridges respectively have counter-circumferential and circumferential faces, each of the ridges' circumferential faces being oriented for latching engagement with one of the hooks' counter-circumferential faces.

10. The filter of claim 1 wherein the torque means comprise a turn handle, the turn handle being fixedly attached to and extending downwardly from the plate.

11. The filter of claim 10 wherein the torque means further comprise a wrench socket, the wrench socket opening downwardly at the torque means' handle.

* * * * *